(12) United States Patent
Chou et al.

(10) Patent No.: US 9,049,608 B2
(45) Date of Patent: Jun. 2, 2015

(54) MEASUREMENTS FOR THE INTERWORKING OF WIRELESS WIDE AREA AND WIRELESS LOCAL AREA NETWORKS

(75) Inventors: Joey Chou, Scottsdale, AZ (US); Muthaiah Venkatachalam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 13/571,278

(22) Filed: Aug. 9, 2012

(65) Prior Publication Data

US 2013/0201842 A1 Aug. 8, 2013

Related U.S. Application Data

(60) Provisional application No. 61/556,109, filed on Nov. 4, 2011.

(51) Int. Cl.
| | |
|---|---|
| *H04L 12/28* | (2006.01) |
| *H04W 24/02* | (2009.01) |
| *H04W 28/08* | (2009.01) |
| *H04W 36/22* | (2009.01) |
| *H04W 92/02* | (2009.01) |

(52) U.S. Cl.
CPC .............. *H04W 24/02* (2013.01); *H04W 28/08* (2013.01); *H04W 36/22* (2013.01); *H04W 92/02* (2013.01)

(58) Field of Classification Search
CPC ...................................................... H04W 28/08
USPC ......................................................... 370/252
See application file for complete search history.

(56) References Cited

U.S. PATENT DOCUMENTS

| | | | |
|---|---|---|---|
| 2001/0022784 A1* | 9/2001 | Menon et al. ................. | 370/352 |
| 2008/0052388 A1* | 2/2008 | Korkishko et al. ............ | 709/223 |
| 2011/0264784 A1* | 10/2011 | Power et al. .................. | 709/223 |
| 2011/0320588 A1* | 12/2011 | Raleigh ......................... | 709/224 |

FOREIGN PATENT DOCUMENTS

| | | |
|---|---|---|
| KR | 10-2005-0066286 A | 6/2005 |
| WO | 2013/067464 A1 | 5/2013 |

OTHER PUBLICATIONS

International Search Report and Written Opinion received for PCT Patent Application No. PCT/US2012/063467, mailed on Mar. 27, 2013, 10 pages.

(Continued)

*Primary Examiner* — Huy D Vu
*Assistant Examiner* — Kevin Cunningham
(74) *Attorney, Agent, or Firm* — Thorpe, North & Western LLP

(57) ABSTRACT

Technology is discussed for capturing performance measurements from Wireless Wide Area Network (WWAN) transmission points and Wireless Local Area Network (WLAN) Access Points (AP). The performance measurements can provide information about the interworking a WWAN and one or more WLANs that can be used to offload traffic from the WWAN. Also, an illustrative example of the collection of performance measurements at a WWAN is explained. Furthermore, the correlation, analysis, and general harnessing of performance measurements to optimize and/or maintain combinations between a WWAN and one or more WLANs is discussed, among other topics.

26 Claims, 8 Drawing Sheets

(56) References Cited

OTHER PUBLICATIONS

Zhang et al, "Efficient Mobility Management for Vertical Handoff between WWAN and WLAN", Integration of wireless LAN and 3G Wireless, IEEE Communications Magazine, Nov. 2003, pp. 102-108.
"Performance measurements Evolved Universal Terrestrial Radio Access Network", 3rd Generation Partnership Project, Technical Specification Group Services and System Aspects, Telecommunication management, Performance Management (PM), 3GPP TS 32.425, vol. 10.0.0, Release 10, Mar. 2010, pp. 1-51.
International Preliminary Report on Patentability and Written Opinion received for PCT Patent Application No. PCT/US2012/063467, mailed on May 15, 2014, 7 pages.
3GPP, "3GPP System to Wireless Local Area Network (WLAN) Interworking", System Description, Universal Mobile Telecommunications System (UMTS), LTE, 3GPP TS 23.234, Version 10.0.0, Release 10, Mar. 2011, 86 pages.

* cited by examiner

MEASUREMENTS FOR THE INTERWORKING OF WIRELESS WIDE AREA AND WIRELESS LOCAL AREA NETWORKS

RELATED APPLICATIONS

This application claims the benefit of and hereby incorporates by reference U.S. Provisional Patent Application Ser. No. 61/556,109, filed Nov. 4, 2011.

BACKGROUND

The amount of data that Wireless Wide Area Networks (WWAN) are being required to handle continues to increase. Some reasons for these increases include the accelerated adoption of smart phones and tablets and the emergence of cloud computing applications. Unfortunately, the deployment of additional cellular radio towers (tower) to meet these demands is costly. Additionally, implementation of advanced technologies within wireless cellular networks is also costly, is done over extended periods of time, and involves other inherent constraints.

Wireless Local Areas Networks (WLAN) provide an alternative mode of wireless communication. Non-limiting examples of such networks are provided in the specifications of Institute of Electrical and Electronics Engineers (IEEE) 802.11 and IEEE 802.15. However, the localized nature of WLANs prevent them from supporting true mobility in wireless communications. Indeed, the differences between WWANs and WLANs have presented obstacles to the use of one type of network to support the other.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
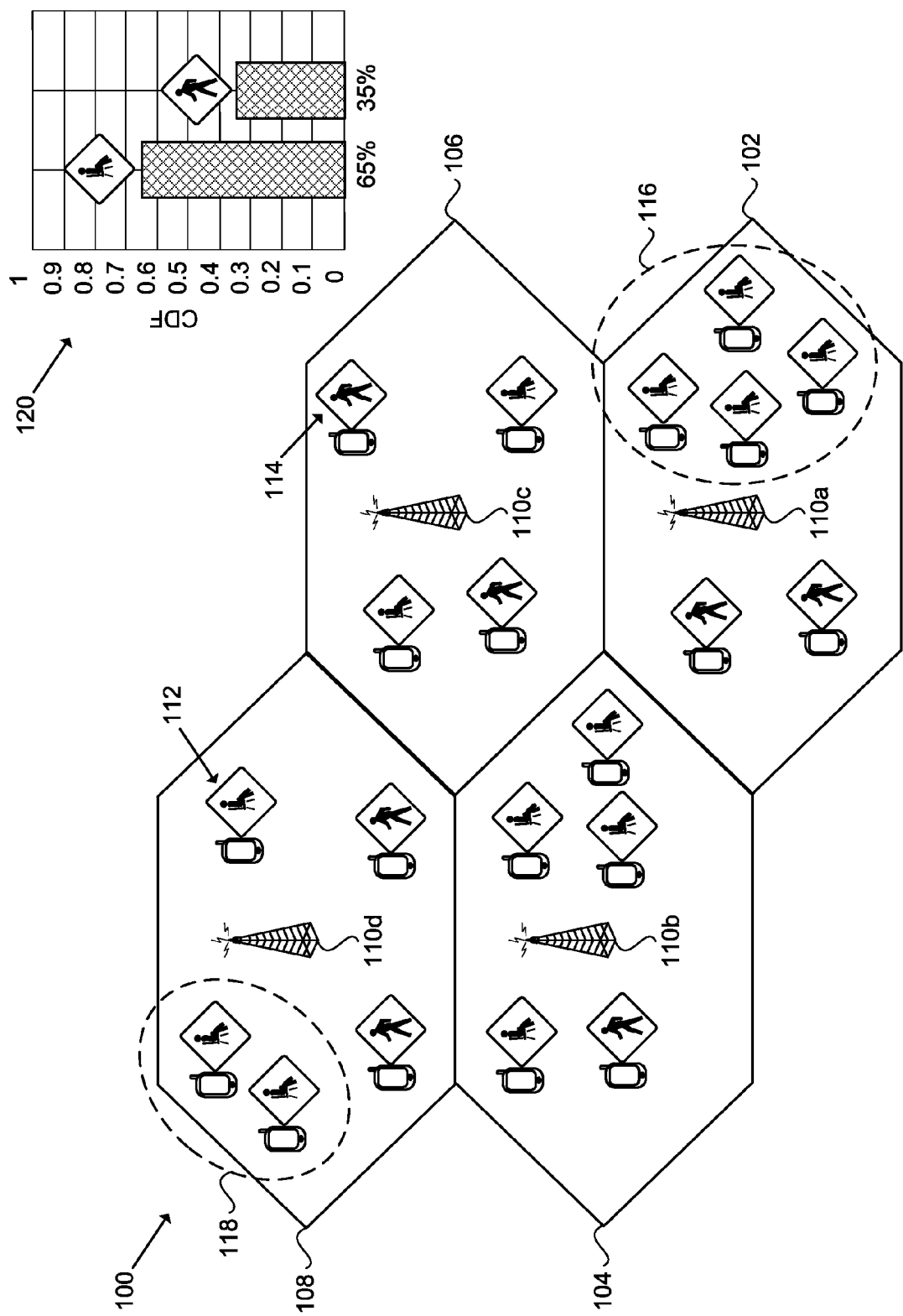
FIG. 1 is a block diagram illustrating a network of Wireless Local Areas Networks (WLAN) towers supporting wireless mobile communication devices together with a Cumulative Distribution Function (CDF) reporting the probabilities of stationary in contrast to truly mobile wireless traffic in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

Different terminology for wireless mobile devices is used in different specifications. As used herein, a wireless mobile device can be a User Equipment (UE), a Mobile Station (MS), among other possibilities. Throughout this application, the terms wireless mobile device, UE, and MS can be used interchangeably.

As used herein the term "cellular radio tower" is defined as a wireless communication device in a wide area wireless network configured to communicate with a plurality of wireless mobile devices located within a geographic region referred to as a cell. Different terminologies for cellular radio towers are used in different specifications. Terminology used for different variations of a cellular radio tower can include, but is not limited to, a Base Station (BS), an evolved Node B (eNodeB or eNB), a WWAN transmission point, and a WWAN node. The terms are used interchangeably, unless otherwise noted. The actual definition of a BS or eNodeB is provided in their Institute of Electronics and Electrical Engineers (IEEE) 802.16 and Third Generation Partnership Project (3GPP) specifications. As an important statement of the generality of embodiments discussed in this disclosure, while the terminology of the 3GPP Long Term Evolution (LTE) standard is often used throughout this specification, it is not intended to be limiting, and there are exceptions in the use of more general terminology in portions of this specification to further communicate this point.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Other terms may be defined elsewhere in the body of this specification.

Example Embodiments

An initial overview of technology embodiments is provided below and then specific technology embodiments are described in further detail later. This initial summary is intended to aid readers in understanding the technology more quickly but is not intended to identify key features or essential features of the technology, nor is it intended to limit the scope of the claimed subject matter.

The economic, time and innovation constraints on conventional approaches to meet the ever increasing size of the load being placed on Wireless Wide Area Networks (WWAN) necessitates the pursuit of additional avenues to reduce the ever increasing load on the WWAN. Wireless Local Area Networks (WLAN), despite their limitations, offer an avenue to offload data for a significant percentage of traffic handled by WWANs. Indeed, wireless cellular network operators have already begun to deploy WLAN Access Points (AP) and to rely on WLANs to offload traffic in particular areas of WWANs and at particular times. Whereas, the use of WLAN APs has been more of a niche solution in the past, WLAN APs will likely play a more and more essential role in offloading data as data loads increase. Greater reliance on WLANs and WLAN APs raises many performance related issues.

Currently, however, no mechanism exists to provide critical performance related data for WLAN APs deployed in coordination with WWANs. This performance data can be used to determine data loads on both the WWAN and WLAN to allow a network operator to optimize the flow of data traffic based on historic use and near real time measurements across the WWAN and WLAN. In addition, collected information can be used to determine if WLAN APs are meeting objectives of data offloading, to detect problems with WLAN APs and the network generally, and to assist in decisions about the use of WLAN APs, among other reasons. Since mobile data traffic can fluctuate rapidly, performance measurements from both the WWAN and WLAN APs need to be collected and correlated frequently. Ideally, approaches to collecting this information can rely on as much legacy infrastructure as possible.

A combination of integrated elements can be used to capture, collect, determine, and/or measure information about wireless mobiles devices, data throughput, and other performance related metrics at one or more WWAN nodes and WLAN APs. As used herein, the term WWAN node can refer to a WWAN transmission point. Depending on the embodiment, these measurements can be made by one or more individual WLAN APs, WWAN nodes, and sub-network servers in communication with a sub-set of one or more WLAN APs and WWAN nodes within the combined network. Information related to a WLAN AP can be correlated, and/or mapped, to a WWAN node based on the location of the WLAN AP within the coverage area of the WWAN node.

The information can then be communicated to a server in the Evolved Packet Core (EPC) of the WWAN, or another type of system-level, server in the WWAN or in communication with the WWAN. The centralized WWAN server can perform calculations to monitor metrics related to the interworking of the WWAN and one or more WLANs. These metrics can be used to automatically adjust data flows and/or indicate actions to be pursued by the WWAN operator.

Such metrics can include, by way of illustration and not limitation, the percentage of data throughput being offloaded from a WWAN to each WLAN AP in a cell at any given time. If the percentage is constantly lower than expected over a period of time, it may be an indication of issues in one or more wireless mobile devices, WWAN nodes, or WLAN APs that can be investigated. Similarly, the constantly low percentages can result in a redirection of data flows away from corresponding WLAN APs.

Additional examples of such metrics can include the percentage of the number of active wireless mobile devices having data that is offloaded from the WWAN node to one or more WLAN APs. If the percentage is constantly lower than expected over a period of time, it may also be an indication of issues in one or more wireless mobile devices, WWAN nodes, or WLAN APs that can be investigated. Again, the constantly low percentages can result in a redirection of data flows away from corresponding WLAN APs. The percentage of data throughput and number of active wireless mobile devices can be used to assist network planning to determine if, or where additional, WLAN AP may need to be deployed and/or control an amount of data which can be automatically directed to the WWAN or WLAN based on the collected statistics. Several other alternatives indicative of a level of integration between the WWAN and the WLAN, are possible. Additional details are discussed below.

FIG. 1 illustrates an example of a WWAN 100 comprised of multiple different cells 102-108. As used herein, the term cell refers to a geographic region over which a cellular radio tower (tower) can communicate with wireless mobile devices. Each cell in FIG. 1 has an evolved Node B (eNodeB) serving as a tower. However, other types of towers, such as Base Stations (BS) or other types of cellular radio transmission points are also possible.

Each of the cells 102-108 has multiple units of User Equipment (UE) traffic within its geographic region of coverage. Each unit of UE traffic is classified as corresponding to either stationary mobile UE traffic 112 or truly mobile UE traffic 114, as indicated by the example instances labeled in FIG. 1. As used herein, the term "stationary mobile UE traffic" describes UE traffic from one or more UEs that are sufficiently stationary that data can be communicated via a WLAN. The WLAN may be configured based on a proprietary standard, such as the IEEE 802.11-2007, IEEE 802.11-2011 standard, IEEE 802.15 standard, Bluetooth standard, or another type of WLAN standard.

As used herein, the term "truly mobile UE traffic" describes UE data traffic that uses the services of a WWAN, such as, without limitation, an Evolved-Universal Terrestrial Radio Access Network (E-UTRAN) or a Universal Mobile Telecommunications System (UMTS) based on the Global System for Mobile Communications (GSM) standard.

Within the first cell, a first cluster of units of stationary mobile UE traffic 116 is depicted by a dashed ellipse. This cluster can pertain to a group of relatively stationary UEs belonging to WLAN network users at an office building, or hotspots deployed by operators. It can also cover a mobile environment where UEs can roam about within the coverage area of the WLAN. A second cluster of stationary UE traffic 118 is depicted in the fourth cell 108. The smaller number of units of stationary mobile UE traffic is used to denote a smaller WLAN, such as might be found in a store, a business, a restaurant, or a home.

Throughout the WWAN 100, the relative number of units of stationary mobile UE traffic 112 (13) to units of truly mobile UE traffic 114s (7) is chosen to coincide with the histogram 120 also depicted in FIG. 1, reporting a Cumulative Distribution Function (CDF) for one study about percentages of wireless traffic that is sufficiently mobile to require the resources of a WWAN. As can be appreciated, only 35% of the UE traffic according to this study is sufficiently mobile to necessitate the support for mobility provided by a WWAN. In other words, as much as 65% of the traffic can be offloaded to one or more WLANs.

Figure 2:
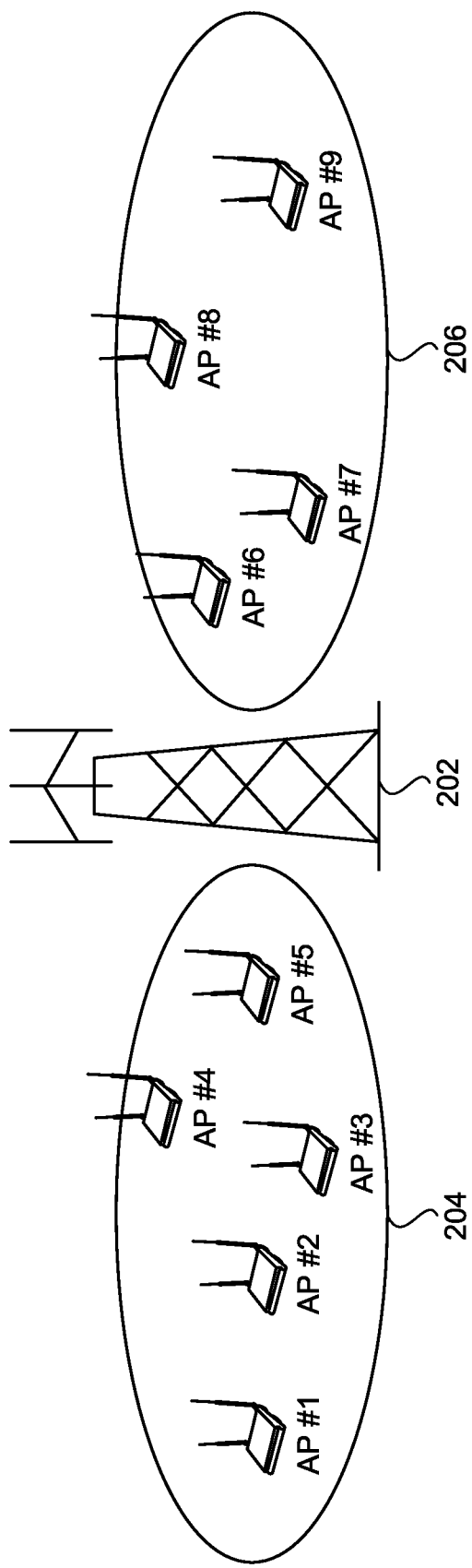
FIG. 2 is a block diagram illustrating several Wireless Local Area Network (WLAN) Access Points (AP) distributed throughout multiple geographic regions that comprise multiple WWAN cells in accordance with an example.

FIG. 2 illustrates distributions of WLAN APs distributed throughout multiple WWAN cells 204, 206 in accordance with an example. A cellular radio tower 202 is depicted, which can be a BS, an eNodeB, or any other transmission point capable of serving as a tower in a WWAN. The tower can be one of many in a WWAN. Additionally, in embodiments where the tower is an eNodeB, the eNodeB can be a high power node such as a MaCro-Node (MCN), or a Low Power Node (LPN). An LPN can be a micro cell, a pico cell, a femto cell, a home eNodeB cell (HeNB), a Remote Radio Head (RRH), a Remote Radio Equipment (RRE), a repeater, or the like. Any combination of MCNs and LPNs in the WWAN, including those making up heterogeneous networks, is possible.

In contrast to FIG. 1, where each tower 110a-d is located at the center of a single cell 102-108, FIG. 2 illustrates an embodiment wherein two distinct cells are depicted 204, 206 associated with a single WWAN tower 202. The variations in the depictions of cells, towers, and other elements serves to emphasize that limitation to a particular configuration, hardware, standard, etc., is not intended. For example, the first cell 204 and the second cell 206 could be the results of beam forming and/or carrier aggregation. In some examples, they could also be the embodiment of sectors of in a cell 102-108 as depicted in FIG. 1.

Within the first cell 204, five WLAN APs (AP #1 to AP #5) are distributed. Within the second cell 206, four additional WLAN APs (AP #6 to AP #9) are distributed. In various embodiments, the first cell and the second cells could be one of many cells within an E-UTRAN. These WLAN APs can be pre-existing and/or distributed by a WWAN operator for purposes of offloading traffic from the WWAN.

In many embodiments, traffic can be offloaded to one or more WLAN APs within an E-UTRAN cell, such as the first cell 204 and the second cell 206, in accordance with specifications, particularly Technical Specification (TS) 23.234, of the Third Generation Partnership Project (3GPP) Long Term Evolution (LTE) for Release 8, Release 9, Release 10 and Release 11. Throughout this application, Release 11 can refer to the prerelease (i.e. State 2 freeze) issued by 3GPP LTE in March of 2012. As recognized by those of ordinary skill in the art, additional specifications, can be used to offload traffic to one or more WLAN APs from alternative WWANs, such as a WWAN defined in Institute of Electronics and Electrical Engineers (IEEE) 802.16, commonly referred to as WiMAX.

WWAN operators have begun to deploy WLAN APs within WWAN cells in an ad hoc manner to offload traffic. However, these deployments are not supported by approaches to determine if WLAN APs are meeting the objectives of offloading traffic. Performance measurements for WLAN APs and other integrated elements are typically not collected and analyzed relative to WWAN traffic to detect problems, suggest improvements, monitor loads, automatically redirect data flows from the UEs to one of the WWAN and WLAN, and so on. As more and more WLAN APs come to be relied upon for the offload of WWAN traffic, the need for such measurement and analysis capabilities increases and the potential advantages grow. Furthermore, due to the dynamic nature of traffic loads, performance measurements need to be made, collected, and analyzed frequently.

Various unutilized elements of infrastructure presently existing in various specifications for WWANs can be used to measure, collect, and possibly analyze offloading statistics in a WWAN and WLAN. This infrastructure can also be used to monitor and redirect data flows. An example architecture relying on such infrastructural elements within a 3GPP-LTE WWAN is discussed below by way of illustration, not limitation. Those of ordinary skill in the art will recognize additional analogous infrastructural elements and protocols designated for alternative WWAN specifications, such as WiMAX or GSM. To emphasize the general application of architectural structures, such as the one discussed below, generalized terminology will also be used in places for the following description.

Figure 3:
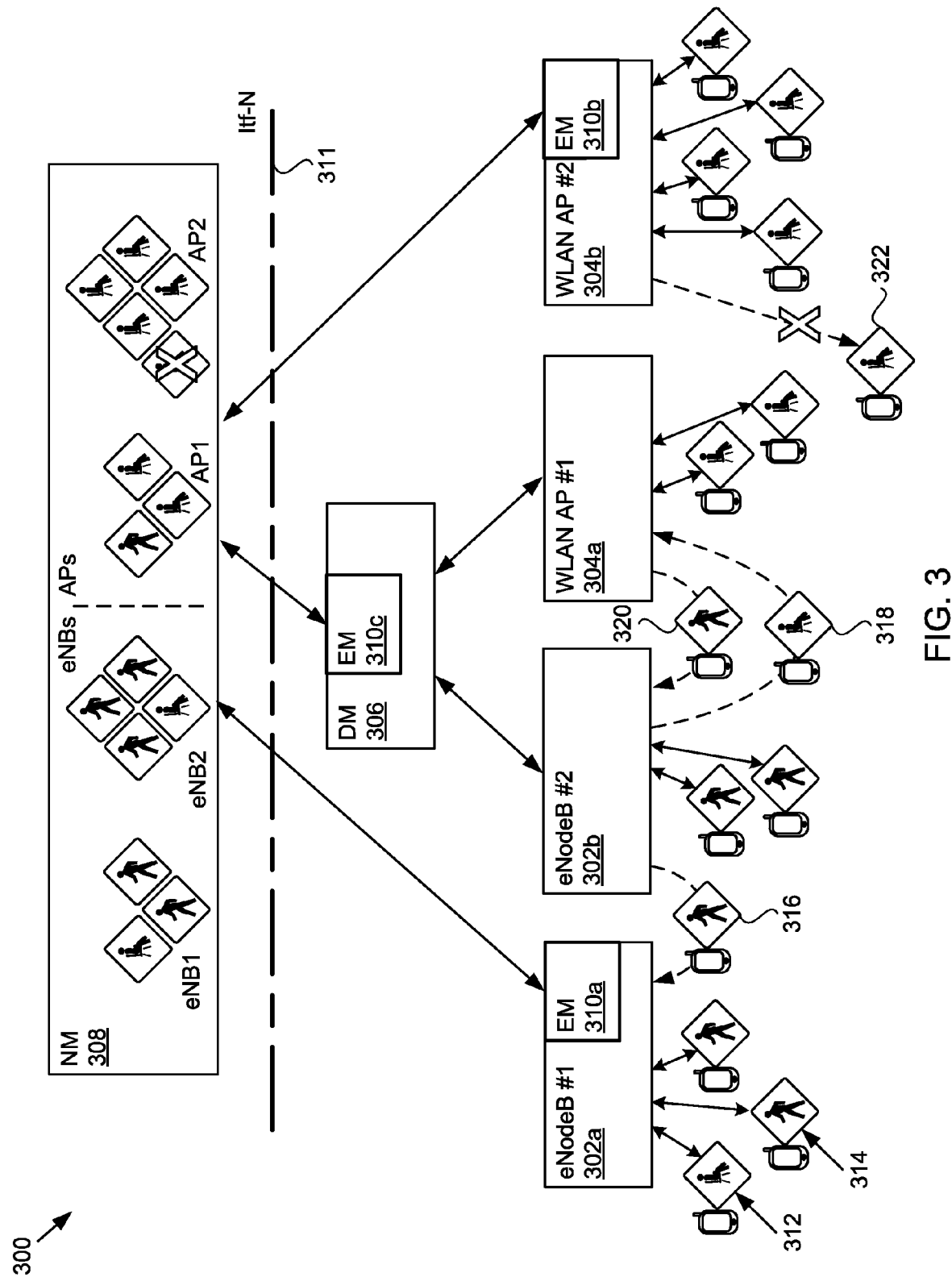
FIG. 3 is a block diagram illustrating an architecture for collecting performance measurements for the interworking of an integrated network combining a WWAN and at least one WLAN in accordance with an example.

FIG. 3 illustrates one example of an architecture for collecting, correlating, and analyzing performance measurements for the interworking of an integrated network combining a WWAN and at least one WLAN. A first eNodeB 302a (eNodeB #1) and a second eNodeB 302b (eNodeB #2) are depicted. However, any number of eNodeBs, or other forms of WWAN transmission points are possible, as previously discussed. Similarly, a first WLAN AP 304a (WLAN AP #1) and a second WLAN AP 304b (WLAN AP #2) are depicted, although any number of WLAN APs are possible.

Associated with each eNodeB 302a, 302b and WLAN AP 304a, 304b are multiple traffic indications. Depending on the embodiment, these traffic indications can either denote units of stationary mobile UE traffic 312 or units of truly mobile UE traffic 314 (similar to the units of stationary mobile UE traffic 112 or units of truly mobile UE traffic 114 depicted in FIG. 1). However, they can also represent actual numbers of stationary, mobile UEs 312 or truly mobile UEs 314.

For scenarios in which the traffic indications 312, 314 correspond to actual UEs, various exchanges between network elements are depicted. For example in a handover, a truly mobile UE 316 is depicted switching from the second eNodeB 302b to the first eNodeB 302a. This change between WWAN transmission points is a common handover procedure defined for various WWAN specifications. The offload, stationary UE 318, in the process of being offloaded from the second eNodeB 302b to the first WLAN AP 304a, provides an example of the offloading central to the interworking of a WWAN with one or more WLANs. Details of the offloading process, as stated above, can be found in specifications of 3GPP LTE, particularly, TS 23.234, or analogous specifications for alternative WWANs. An inverse operation is also depicted with the newly, truly-mobile UE 320. This newly, truly-mobile UE is in the process of leaving the first WLAN AP 304a to the second eNodeB 302b to connect to an E-UTRAN to support its newly entered state of mobility from its previous stationary state. Specifications for accessing a WWAN are common to WWAN specifications generally.

An involuntarily dropped UE 322 is also depicted. The involuntarily dropped UE previously was served by the second WLAN AP 304b. Tracking such involuntarily dropped UEs is important to the monitoring of combined WWAN/WLAN systems as discussed below.

Additionally, a Domain Manager 306 (DM), as defined in 3GPP LTE TS 32.101 and other consistent specifications, is depicted. In one embodiment, a sub-network server in communication with a sub-set of one or more WLAN APs and WWAN nodes within the combined network can perform the functions of the DM in alternative embodiments. The use of multiple DMs is also possible. In addition, FIG. 3 illustrates the use of a Network Manager (NM) server 308, as defined in 3GPP LTE TS 32.101 and other consistent specifications. However, any number of different WWAN servers, system servers and/or system-levels servers can be configured to operate as a network manager server, as can be appreciated. As used herein, the term "system" refers to a combined network with a WWAN and one or more WLANs and supporting infrastructure. An ORACLE Access Management (OAM) server provides one example of several different possibilities for a network manager server.

The eNodeBs 302a, 302b, WLAN APs 304a, 304b, and the DM 306 can be designated as integrated elements and/or network elements. An Element Manager 310a-c (EM) can reside on any of these integrated elements. However, there can be integrated elements that do not include an EM. As with the DM and the NM 308, an EM is defined in 3GPP-LTE TS 32.101 and other consistent specifications.

The EM 310a-c can be configured to perform one or more performance measurements providing information about the performance of one or more WLAN APs 304a, 304b and/or WWAN nodes 302a, 302b. Where the EM resides on a WLAN AP or WWAN node, the EM can perform the measurement directly. Where the EM resides on a DM 306, the EM configures one or more WLAN APs and/or WWAN nodes to perform and report one or more performance measurements (as indicated by the two way arrows between the DM and the second eNodeB 302b and the first WLAN AP 304a). A WLAN AP and/or a WWAN node can be designated as a network element for which performance measurements are performed. Where a network element, such as a WLAN AP or a WWAN node, does not have an EM, performance measurements are acquired indirectly through a DM. Performance measurements can be made in terms of the stationary traffic indications 312 and the truly mobile traffic indications 314 discussed above, as associated with the various network elements.

As shown by the two way arrows between each EM 310a-c and the NM/WWAN server/system server/system-level server 308 in FIG. 3, each EM can be in communication with the NM. Furthermore, each EM can be configured to send the performance measurements to the WWAN server 308 that is configured to collect such performance measurements from multiple interworking/system elements. In certain embodiments, performance measurements can be communicated to the NM from one or more EMs over an interface-N (Ift-N) 311 as defined in specifications for any of 3GPP LTE Release 8, Release 9, Release 10, and Release 11. Analogous interfaces and/or protocols pertaining to alternative WWAN specifications will be apparent to those of ordinary skill in the art. Furthermore, depending on the embodiment, an EM 310a-c and/or the NM 308 can map the location of one or more WLAN APs 304a, 304b to a coverage area of a particular eNodeB 302a, 302b.

In certain embodiments, the various functions performed by an EM 310a-c, as described above, can be divided up into functions performed by various modules. The functionality of these modules will be discussed in greater detail below. Such modules can include, for example and not by way of limitation, a measurement module, a communication module, and a mapping module. In embodiments that rely on a WWAN specification apart from 3GPP LTE specifications, these modules can be embodied in a device, or some other element, residing on the interworking elements defined above to serve the role of an EM.

As can be appreciated from the depiction of the NM 308 in FIG. 3, the performance measurements communicated to the NM can communicate information about the stationary traffic indications 312 and the truly mobile traffic indications 314, as associated with eNodeBs 302a, 302b and WLAN APs 304a, 304b generally and/or individually. Information about the involuntarily dropped UE 322 is also communicated. (The other UEs communicating data that is in the process of being exchanged between system elements, 316, 318, and 320 are represented in the NM with their source system element in as much as the various exchanges are not yet completed.) As discussed below, this information can be used by the NM to assist in optimizing and maintaining the combined system of the WWAN with one or more WLANs.

The nature of the performance measurements can be chosen to contribute to the interworking between the WWAN and one or more WLANs. By way of illustration and not limitation, the following are some examples of possible types of performance measurements. One example can include a measurement of an aggregate data throughput. Another example can include a data throughput per Quality of Service (QoS) class. Another example could be a number of connected wireless mobile devices. Yet another example comprises a number of dropped wireless mobile devices by the network element. Additional performance measurements, related to the integration of a WWLAN with one or more WLANs will be apparent to those of ordinary skill in the art. In some embodiments, the performance measurement can be specific to a network element, such as a WLAN AP 304a, 304b or a WWAN node 302a, 302b. Performance measurements can also report alarms, indicative of problems, at network elements.

Any combination of these measurements can be assignable to a time of day and/or a day of the week. The time of day can be any unit of time sufficiently small to capture significant changes in the nature of traffic within the combined system. Example times of day can include early afternoon, late afternoon, and evening hours. However, larger and finer granularities with respect to time are possible. Additionally, these performance measurements can be collected and reported to the NM 308 with sufficient frequency to allow for optimization of the system and near real time response to any failures or other problems. In this way, large efficiencies are obtainable over a semi-static approach. In current semi-static approaches, infrastructure is deployed based on a single set of measurements, or on the basis of intuition, and then left unattended except for periodic maintenance, or servicing necessary to address obvious problems. Such approaches are incapable of achieving the levels of optimization and response achievable with frequent performance measurements.

To optimize, maintain, and/or monitor the interworking of the WWAN and the one or more WLANs and/or automatically control data flow, the NM/WWAN server/system server/system-level server 308 in FIG. 3 can analyze the performance information to produce monitoring/performance results. Examples of such monitoring and/or interworking results can include results that can be used to monitor a percentage of data throughput, at any given time, being offloaded from a selected WWAN node, or set of WWAN nodes, 302a, 302b to a selected WLAN AP, or set of WLAN APs, 304a, 304b and/or an overall percentage of data throughput being offloaded from a set of WWAN nodes to a set of WLAN APs, wherein a set can comprise a single element.

If the percentage is consistently lower than a predetermined threshold over a period of time, it may indicate issues with system elements, and or their interworking with UEs, that should be investigated. Where no traffic is offloaded to a given WLAN AP, there may be a fault with the particular WLAN AP. Data flows can be automatically redirected from such APs. If the percentage of data traffic that is offloaded from the WWAN to the WLAN is consistently higher than a predetermined threshold, deployment of additional WLAN APs in the WLAN may be in order. Similarly, data flows can also be redirected to other WLANS or to other Aps within a WLAN to better balance the load. Additionally, this metric can be used for network planning, in the sense that if an eNodeB in the WWAN remains congested, additional WLAN APs may also be in order to relieve data congestion at the eNodeB.

Additional examples include results that can be used to monitor a number of active wireless mobile devices associated with the selected WWAN node, or set of WWAN nodes, and connected to the selected WLAN AP, or set of WLAN APs. Further examples can include a percentage of data throughput being offloaded from the selected WWAN node, or set of WWAN nodes, to a set of WLAN APs in a coverage area of the selected WWAN node, or set of WWAN nodes. Similar automatic data flow determinations, network planning, and maintenance determinations, such as those discussed above, can be made based on these results. Information about a number of wireless mobile devices associated with the selected WWAN node, or set of WWAN nodes, and involuntarily disconnected from one or more WLAN APs within the coverage area can also be important to identify problems with a WLAN AP and to automatically control data flows between the WWAN and the WLAN.

Figure 4:
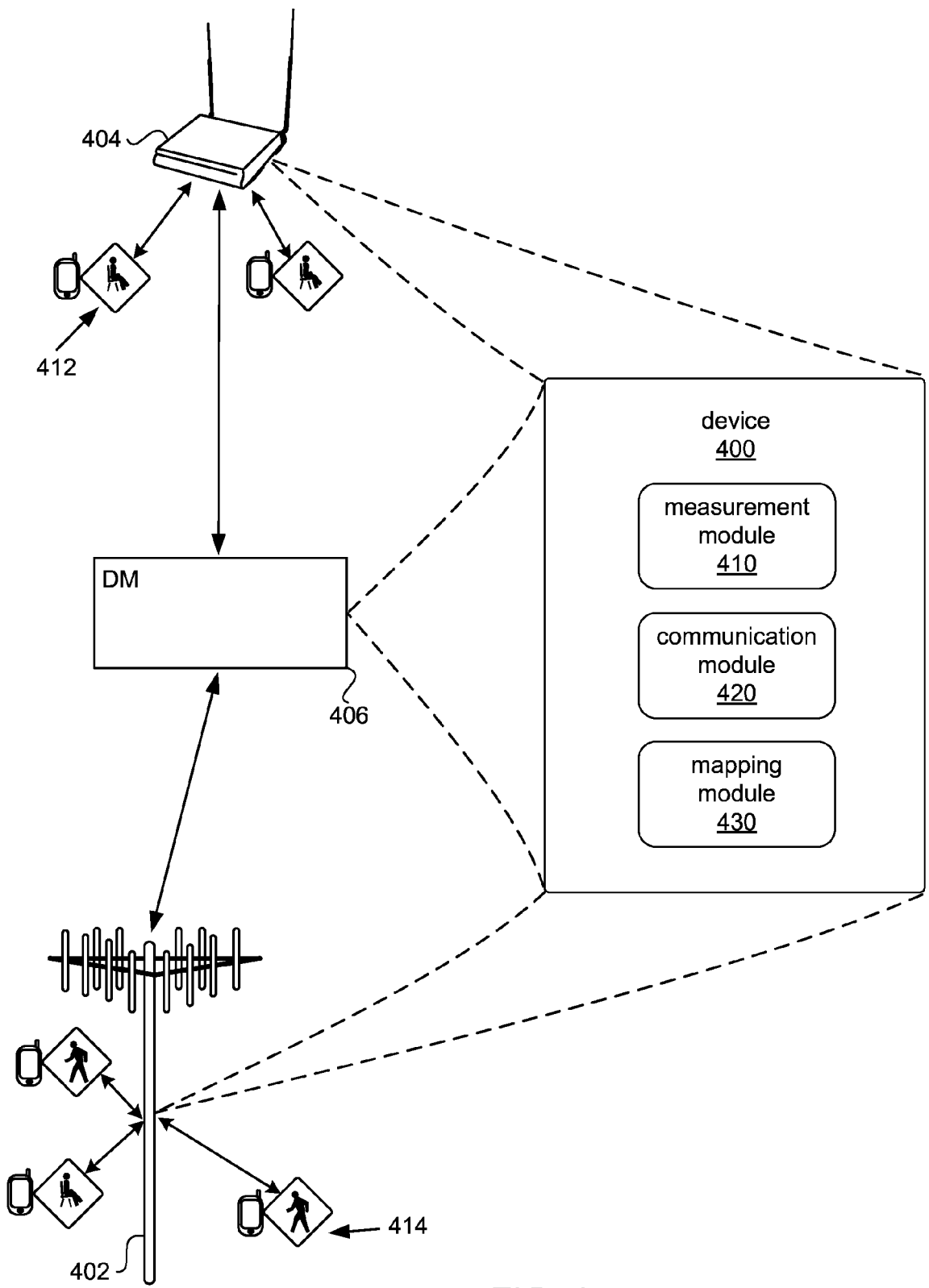
FIG. 4 is a block diagram illustrating a device for managing WWAN WLAN interworking and some system entities on which it can reside in accordance with an example.

FIG. 4 depicts a device 400 for managing WWAN/WLAN interworking and some system entities on which it can reside in accordance with an example. The device can reside on one or more integrated elements. Such integrated elements can include a WWAN node 402, a WLAN AP 404, and/or a DM/sub-network server 406, in communication with the WWAN node and/or the WLAN AP. The WWAN node and/or the WLAN AP are associated with stationary mobile traffic indications 412 and the truly mobile traffic indications 414 similar to those depicted in FIG. 3. In certain embodiments, the WWAN node can be an evolved Node B, as defined in 3GPP LTE specifications for one of Release 8, Release 9, Release 10, and Release 11. In some embodiments, the WLAN AP can be an AP as defined in one of the IEEE 802.11 specifications and the IEEE 802.15 specifications.

The device 400 can include a measurement module 410, a communication module 420, and/or a mapping module 430. The measurement module can be configured to perform one or more performance measurements from the interworking element on which it resides. A performance measurement can provide information about the performance of one or more WLAN APs and/or WWAN nodes, for a combined system comprising a WWAN interworking with one or more WLANs.

The communication module 420 can be in communication with the measurement module 410. The communication module can be configured to send one or more performance measurements to a WWAN server. The WWAN server can be configured to collect performance measurements from multiple interworking elements. In certain embodiments, the communication module can send the performance measurement to the WWAN server over an interface-N as defined in 3GPP LTE specifications for one of Release 8, Release 9, Release 10, and/or Release 11.

Depending on the embodiment, the device 400 can also include a mapping module 430. The mapping module can be in communication with the measurement module 410. Also, the mapping module can be configured to map a location of an interworking element comprising a particular WLAN AP to a coverage area of a particular WWAN node.

With respect to the performance measurements discussed above, a performance measurement can comprise an aggregate data throughput, a data throughput per (QoS) class, a number of connected wireless mobile devices, and/or a number of dropped wireless mobile devices, among other possibilities. Such a performance measurement can be specific to one or more WLAN APs and/or WWAN nodes. In various embodiments, the measurement module 410 performs a series of performance measurements on one or more WLAN APs 404 and at least one WWAN node 402 with sufficient regularity for the calculation of monitoring results with a granularity defined by a day of a week and a traffic-specific period of the day.

In certain embodiments, the interworking element can be a sub-network server 406 of the WWAN. In some embodiments, the sub-network can comprise a DM. Additionally, the measurement module in the sub-network server can be configured to collect performance measurements on WLAN APs and/or WWAN nodes within a sub-network or the WWAN pertaining to the sub-network server. In such embodiments, the measurement module 410 of the sub-network server is configured to collect at least one performance measurement on the one or more WWAN nodes and/or WLAN APs so that at least one monitoring result can be determined.

The monitoring result can comprise a percentage of data throughput being offloaded from a selected WWAN node to a selected WLAN AP. The monitoring result can also comprise a number of active wireless mobile devices associated with the selected WWAN node and connected to the selected WLAN AP. As another non-limiting example, the monitoring result can comprise a percentage of data throughput being offloaded from the selected WWAN node to a set of WLAN APs in a coverage area of the selected WWAN node. A number of wireless mobile devices associated with the selected WWAN node and involuntarily disconnected from a WLAN AP within the coverage area of the selected WWAN node comprises another non-limiting example of a performance measurement.

In certain embodiments, the measurement module 410 and the communication module 420 can reside in an EM at the interworking element. In such embodiments, the WWAN server can comprise an NM. The EM and the NM can be configured as defined in 3GPP LTE specifications for one of Release 8, Release 9, Release 10, and Release 11.

Figure 5:
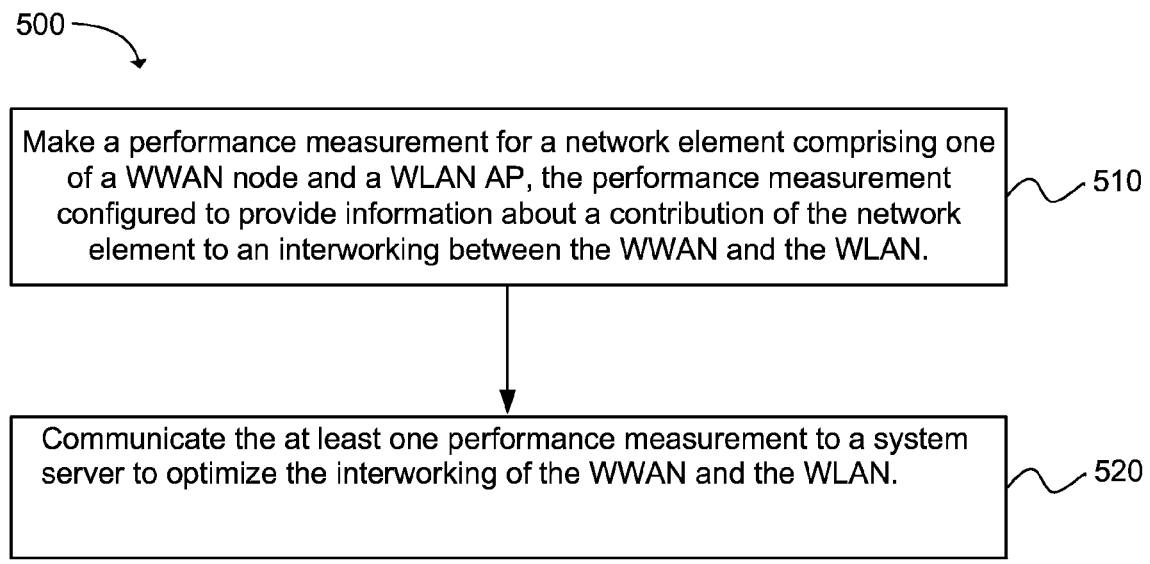
FIG. 5 is a flowchart depicting a process for acquiring performance measurements for network elements in a system comprising a WWAN interworking with one or more WLANs in accordance with another example.

FIG. 5 is a flowchart of a method 500 for acquiring performance measurements for network elements in a system comprising a WWAN interworking with one or more WLANs in accordance with another example. The method can, but need not necessarily, be embedded in a computer program product comprising a non-transitory computer usable medium. The computer readable medium can have a computer readable program code embodied therein. The computer readable program code can be adapted to be executed to implement instructions for the method.

The method 500 can comprise making a performance measurement 510 for a network element comprising one of a WWAN node and a WLAN AP. The performance measurement can be configured to provide information about a contribution of the network element to the interworking between the WWAN and the WLAN. Additionally, the method can comprise communicating 520 one or more performance measurements to a system server to optimize the interworking of the WWAN and the WLAN. In some embodiments, the method can also comprise correlating the network element to a coverage area of a WWAN node in the WWAN.

The performance measurement can comprise an aggregate data throughput, a throughput per (QoS) class, a number of connected wireless mobile devices, and a number of dropped wireless mobile devices. In some embodiments, the performance measurements can correspond to a particular WWAN node and a particular WLAN AP within a coverage area of the particular WWAN node such that at least one interworking result can be determined, the interworking result can comprise a percentage of data throughput being offloaded from the particular WWAN node to a particular, or more than one, WLAN AP. An interworking result can also be a number of active wireless mobile devices associated with the particular WWAN node and connected to the particular WLAN AP. As another example, an interworking result can be a number of wireless mobile devices associated with the particular WWAN node and involuntarily disconnected from the particular WLAN AP within the coverage area of the particular WWAN node.

In certain embodiments, involving an embedded in a computer program product, the computer program product can reside on a sub-network server capable of making a performance measurement on a WWAN node and a WLAN AP within a sub-network pertaining to the sub-network server. In such embodiments, the system server can be located at one of a Serving-GateWay (S-GW), a Mobility Management Entity (MME), a Packet Data Network GateWay (P-GW), and an external location connected to the P-GW. The S-GW, the MME, and the P-GW are configured as defined in 3GPP LTE specifications for one of Release 8, Release 9, Release 10, and Release 11.

In some embodiments, the WWAN node can be an evolved Node B. Additionally, the step of communicating one or more performance measurements toward a system server can occur over an interface-N. In such embodiments, the system server can be a network manager. Additionally, in such embodiments, the computer program product can reside on an EM. The eNodeB, the interface-N, the network manager, and the element manager are configured as defined in 3GPP LTE specifications for one of Release 8, Release 9, Release 10, and Release 11. Also, the WLAN AP can be an AP as defined in one of the IEEE 802.11 specifications and the IEEE 802.15 specifications.

Figure 6:
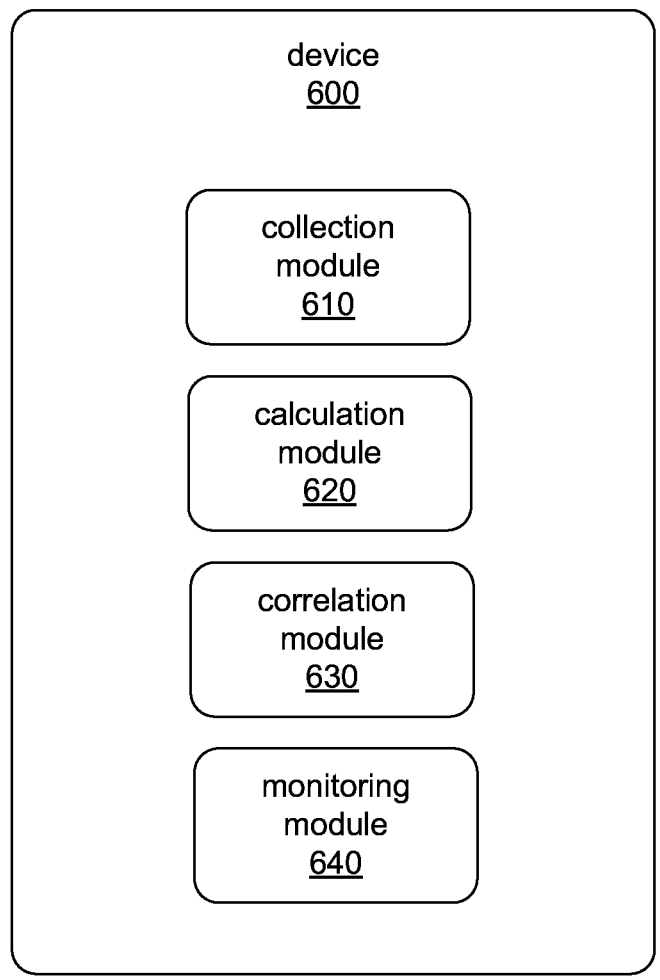
FIG. 6 is a block diagram illustrating a device for monitoring performance of network elements facilitating interworking between a WWAN and one or more WLANs in accordance with another example.

FIG. 6 depicts a device 600 for monitoring performance of system elements that facilitate interworking between a WWAN and one or more WLANs in accordance with another example. The device can comprise any combination of a collection module 610, a calculation module 620, a correlation module 630, and a monitoring module 640. The collection module can reside on a system-level server, such as the server 380 depicted in FIG. 3. Furthermore, the collection module can be configured to receive one or more performance measurement pertaining to one or more system elements. Such a system element can comprise a WWAN node, a WLAN AP, and/or a sub-network server. Such performance measurements can be configured to provide information about data offloading between a WWAN and one or more WLANs facilitated by the given system element.

The calculation module 620 can be in communication with the collection module 610. The calculation module can be configured to calculate one or more performance results from the at least one performance measurement received by the collection module. One or more performance results can be used to optimize integration between the WWAN and one or more WLANs.

In some embodiments, the performance result can comprise a percentage of data throughput being offloaded from a selected WWAN node to a selected WLAN AP. An additional example of a performance result can comprise a number of active wireless mobile devices associated with the selected WWAN node and connected to the selected WLAN AP. Another example can include a percentage of data throughput being offloaded from the selected WWAN node to a set of WLAN APs in a coverage area of the selected WWAN node. An additional example can be a number of wireless mobile devices associated with the selected WWAN node and involuntarily disconnected from a WLAN AP within the coverage area of the selected WWAN node. Other examples of performance results, apparent to those of ordinary skill in the art, are also possible.

Some embodiments can include a correlation module 630. The correlation module can be in communication with the collection module 610. Such a correlation module can be configured to correlate at least one performance measurement to a coverage area for a particular WWAN node at a given time.

Certain embodiments can include a monitoring module 640 in communication with the calculation module 620. The monitoring module can be configured to provide an indication signal upon receiving a performance result calculated below a threshold value. The threshold value can be determined to optimize the interworking of a WWAN with one or more WLANs. The performance result can indicate a percentage of data throughput being offloaded from a particular WWAN node to a selected WLAN AP. The performance result can also indicate a number of active wireless mobile devices being offloaded from the particular WWAN node to the selected WLAN AP. In some embodiments, the performance result can be a percentage of data throughput being offloaded from the particular WWAN node to the at least one WLAN AP within the coverage area of the particular WWAN node. Also, among other possibilities, a performance result can be a number of wireless mobile devices associated with the particular WWAN node and involuntarily disconnected from a WLAN AP within the coverage area of the particular WWAN node.

In some examples of the device 600, the monitoring module 640 can wait to provide the indication signal until the performance result is consistently calculated below the threshold value for a predetermined period of time. The period of time can be determined based on statistics of element performance. Also, with respect to some devices, the calculation module 620 can calculate the performance result with sufficient frequency such that the performance result can be correlated with a specific day and a traffic-specific period of the day.

In some embodiments, the system server can be an NM located at one or more of a Software Gate Way (S-GW), a Mobility Management Entity (MME), a Packet Data Network GateWay (P-GW), and/or an external location connected to the P-GW. The NM, S-GW, MME, and P-GW can be configured as defined in 3GPP LTE specifications for any of Release 8, Release 9, Release 10, and Release 11. The WWAN node can be an eNodeB, as defined 3GPP LTE specifications for any of Release 8, Release 9, Release 10, and Release 11. Also, the WLAN AP can be an AP as defined in one of the IEEE 802.11 specifications and the IEEE 802.15 specifications, or another WLAN specification such as Bluetooth.

Figure 7:
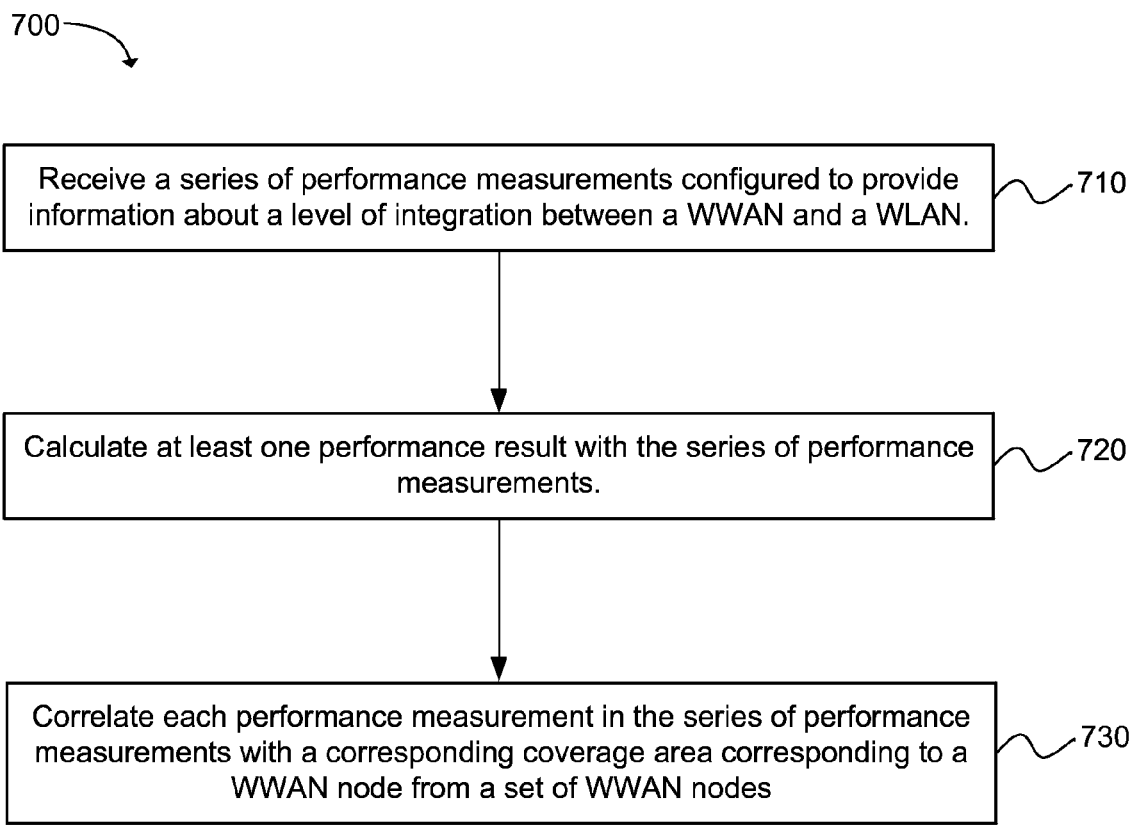
FIG. 7 is a flowchart depicting a process to calculate a performance metric used to determine a role played by a network element in integrating a WWAN and one or more WLANs in accordance with another example.

FIG. 7 provides a flowchart depicting a method 700 to calculate a performance metric used to determine a role played by a network element in integrating a WWAN and a WLAN in accordance with another example. The method begins by receiving 710 a series of performance measurements configured to provide information about a level of integration between a WWAN and one or more WLANs. The method proceeds by calculating 720 one or more performance results with the series of performance measurements. In some, but not all, embodiments, the method can comprise a further step of correlating 730 each performance measurement in the series of performance measurements at any given time with a corresponding coverage area corresponding to a WWAN node from a set of WWAN nodes.

The performance result can comprise a percentage of data throughput being offloaded from the particular eNodeB to a given WLAN AP. Another example of a performance result is a number of active UEs being offloaded from the particular eNodeB to the given WLAN AP. Additionally, a percentage of data throughput being offloaded from the particular eNodeB to one or more WLAN APs within the coverage area of the particular eNodeB provides another example of a performance result. The performance result can also be a number of UEs being offloaded from the particular eNodeB to one or more WLAN APs within the coverage area of the particular eNodeB.

The method 700 can also comprise monitoring the performance result(s) to provide a message when the value of the performance result(s) has been below a threshold for a predetermined amount of time. Additionally, the method can involve calculating the performance result for a given network element at a set of time intervals. Each time interval in the set of time intervals can correspond to a duration of a predetermined period corresponding to an anticipated distinct traffic load.

In some embodiments, the system server can be an NM located at one or more of an S-GW, an MME, a P-GW, and/or an external location connected to the P-GW. The NM, S-GW, MME, and P-GW can be configured as defined in 3GPP LTE specifications for any of Release 8, Release 9, Release 10, and Release 11. The WWAN node can be an eNodeB, as defined 3GPP LTE specifications for any of Release 8, Release 9, Release 10, and Release 11. Also, the WLAN AP can be an AP as defined in one of the IEEE 802.11 specifications and the IEEE 802.15 specifications.

Figure 8:
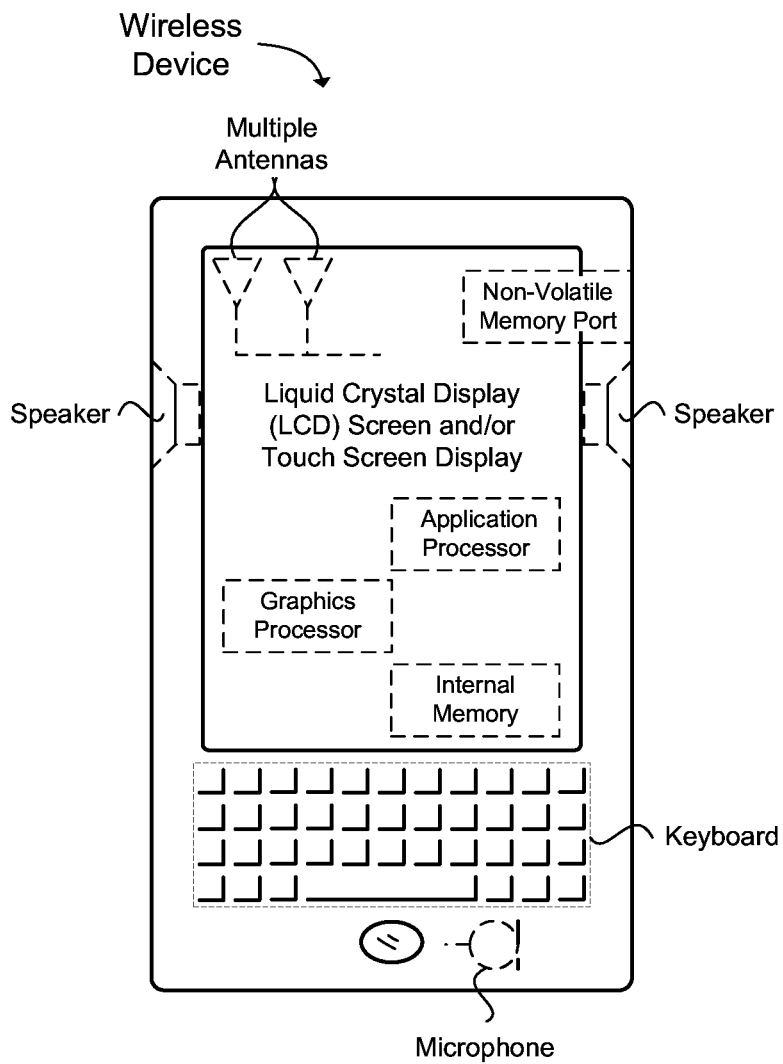
FIG. 8 is a block diagram of a UE in accordance with another example.

FIG. 8 provides an example illustration of a mobile device, such as UE, a mobile station (MS), a mobile wireless mobile device, a mobile communication device, a tablet, a handset, or other type of mobile wireless mobile device. The mobile device can include one or more antennas configured to communicate with a BS, an eNodeB, or other type of WWAN AP. While two antennas are shown, the mobile device may have between one and four or more antennas. The mobile device can be configured to communicate using at least one wireless communication standard including 3GPP LTE, Worldwide interoperability for Microwave Access (WiMAX), High Speed Packet Access (HSPA), Bluetooth, WiFi, or other wireless standards. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A device for managing Wireless Wide Area Network and Wireless Local Area Network interworking, comprising:
    a measurement module, residing at an interworking element, the measurement module configured to perform at least one performance measurement at the interworking element providing information about the performance of at least one Wireless Local Area Network (WLAN) Access Point (AP) and at least one Wireless Wide Area Network (WWAN) node, in a combined system comprising a WWAN interworking with at least one WLAN; and
    a communication module, in communication with the measurement module, and configured to send the at least one performance measurement to a Network Management (NM) server configured to collect performance measurements from multiple interworking elements, wherein the NM server collects the performance measurements in order to determine at least one monitoring result for the WLAN AP and the WWAN node, wherein the at least one monitoring result comprises one or more of:
    a percentage of data throughput being offloaded from a selected WWAN node to a selected WLAN AP;
    a number of active wireless mobile devices associated with the selected WWAN node and connected to the selected WLAN AP;
    a percentage of data throughput being offloaded from the selected WWAN node to a set of WLAN APs in a coverage area of the selected WWAN node; or
    a number of wireless mobile devices associated with the selected WWAN node and involuntarily disconnected from the selected WLAN AP within the coverage area of the selected WWAN node.

2. The device of claim 1, further comprising a mapping module, in communication with the measurement module, configured to map a location of an interworking element comprising a particular WLAN AP to a coverage area of a particular WWAN node.

3. The device of claim 2, wherein a performance measurement of the at least one performance measurement comprises at least one of an aggregate data throughput, a data throughput per quality of service class, a number of connected wireless mobile devices, and a number of dropped wireless mobile devices, wherein the performance measurement is specific to at least one of at least one WLAN AP and a WWAN node.

4. The device of claim 1, wherein the interworking element is a sub-network server of the WWAN, and the measurement module in the sub-network server is configured to collect performance measurements on at least one of any of a WLAN AP and a WWAN node within a sub-network of the WWAN pertaining to the sub-network server.

5. The device of claim 4, wherein the sub-network comprises a Domain Manager (DM).

6. The device of claim 1, wherein the communication module sends the at least one performance measurement to the NM server over an interface-N.

7. The device of claim 1, wherein the WWAN node is an evolved Node B, as defined in Third Generation Partnership Project (3GPP) Long Term Evolution (LTE) specifications for one of Releases 8, 9, 10, and 11, and the WLAN AP is an AP as defined in one of Institute of Electrical and Electronics Engineers (IEEE) 802.11 specifications and IEEE 802.15 specifications.

8. The device of claim 1, wherein the measurement module performs a series of performance measurements on at least one of at least one WLAN AP and at least one WWAN node with sufficient regularity for the calculation of monitoring results with a granularity defined by a day of a week and a traffic-specific period of the day.

9. A computer program product comprising a non-transitory computer usable medium having a computer readable program code embodied therein, the computer readable program code adapted to be executed to implement a method for acquiring performance measurements for network elements in a system comprising a Wireless Wide Area Network (WWAN) interworking with at least one Wireless Local Area Network (WLAN), comprising:
    making at least one performance measurement for a network element comprising one of a WWAN node and a WLAN Access Point (AP), the performance measurement configured to provide information about a contribution of the network element to an interworking between the WWAN and the WLAN; and
    communicating the at least one performance measurement to a system server to optimize the interworking of the WWAN and the at least one WLAN, wherein the system server is configured to determine at least one interworking result for the system comprising the WWAN interworking with the WLAN, wherein the inter working result comprises one or more of:
    a percentage of data throughput being offloaded from the WWAN node to the WLAN AP, wherein the WLAN AP is within a coverage area of the WWAN node;
    a number of active wireless mobile devices associated with the WWAN node and connected to the WLAN AP; or
    a number of wireless mobile devices associated with the WWAN node and involuntarily disconnected from the WLAN AP within the coverage area of the WWAN node.

10. The computer program product of claim 9, further comprising correlating the network element to a coverage area of a WWAN node in the WWAN.

11. The computer program product of claim 9, wherein the performance measurement comprises at least one of an aggregate data throughput, a throughput per quality of service class, a number of connected wireless mobile devices, and a number of dropped wireless mobile devices.

12. The computer program product of claim 9, wherein the computer program product resides on a sub-network server capable of making a performance measurement on a WWAN node and a WLAN AP within a sub-network pertaining to the sub-network server.

13. The computer program product of claim 9, wherein the WWAN node is an evolved Node B, communicating the at least one performance measurement toward a system server occurs over an interface-N, the system server is a Network Manager, and the computer program product resides on an Element Manager, wherein the eNodeB, the interface-N, the NM, and the EM are configured as defined in Third Generation Partnership Project (3GPP) Long Term Evolution (LTE) specifications for one of Releases 8, 9, 10, and 11 and wherein the WLAN AP is an AP as defined in one of Institute of Electrical and Electronics Engineers (IEEE) 802.11 specifications and IEEE 802.15 specifications.

14. The computer program product of claim 9, wherein the system server is located at one of a Serving-GateWay (S-GW), a Mobility Management Entity (MME), a Packet Data Network GateWay (P-GW), and an external location connected to the P-GW.

15. A device for monitoring performance of network elements facilitating interworking between a Wireless Wide Area Network and at least one Wireless Local Area Network, comprising:
a collection module, residing at a system-level server, the collection module configured to receive at least one performance measurement pertaining to at least one network element, wherein a network element comprises one of a Wireless Wide Area Network WWAN node, a Wireless Local Area Network (WLAN) Access Point (AP), and a sub-network server, wherein the at least one performance measurement is configured to provide information about data offloading between a WWAN and at least one WLAN facilitated by the given network element; and
a calculation module, residing at the system-level server and in communication with the collection module, configured to calculate at least one performance result from the at least one performance measurement received by the collection module to optimize integration between the WWAN and the at least one WLAN, wherein the performance comprises one or more of:
a percentage of data throughput being offloaded from a selected WWAN node to a selected WLAN AP;
a number of active wireless mobile devices associated with the selected WWAN node and connected to the selected WLAN AP;
a percentage of data throughput being offloaded from the selected WWAN node to a set of WLAN APs in a coverage area of the selected WWAN node; or
a number of wireless mobile devices associated with the selected WWAN node and involuntarily disconnected from the selected WLAN AP within the coverage area of the selected WWAN node.

16. The device of claim 15, further comprising a correlation module, in communication with the collection module, configured to correlate at least one performance measurement at a given time to a coverage area for a particular WWAN node.

17. The device of claim 15, further comprising a monitoring module, in communication with the calculation module, configured to provide an indication signal upon receiving a performance result calculated below a threshold value.

18. The device of claim 17, wherein the monitoring module waits to provide the indication signal until the performance result is consistently calculated below a threshold value for a predetermined period of time.

19. The device of claim 15, wherein the calculation module calculates the performance result with sufficient frequency such that the performance result can be correlated with a specific day and a traffic-specific period of the day.

20. The device of claim 15, wherein:
the system server is a network manager located at one of a Serving-GateWay (S-GW), a Mobility Management Entity (MME), a Packet Data Network GateWay (P-GW), and an external location connected to the P-GW;
the WWAN node is an evolved Node B; and,
the WLAN AP is an AP as defined in one of Institute of Electrical and Electronics Engineers (IEEE) 802.11 specifications and IEEE 802.15 specifications.

21. A computer program product comprising a non-transitory computer usable medium having a computer readable program code embodied therein, the computer readable program code adapted to be executed to implement instructions to calculate a performance metric used to determine a role played by a network element in integrating a Wireless Wide Area Network and at least one Wireless Local Area Network, comprising:
receiving, at a system server, a series of performance measurements configured to provide information about a level of integration between a Wireless Wide Area Network (WWAN) and a Wireless Local Area Network (WLAN); and
calculating, at the system server, at least one performance result with the series of performance measurements, wherein the performance result comprises one or more of:
a percentage of data throughput being offloaded from a particular eNodeB to a given WLAN AP;
a number of active UEs being offloaded from the particular eNodeB to the given WLAN AP;
a percentage of data throughput being offloaded from the particular eNodeB to the at least one WLAN AP within the coverage are of the particular eNodeB; or
a number of UEs being offloaded from the particular eNodeB to the at least one WLAN AP within the coverage area of the particular eNodeB.

22. The computer program product of claim 21, further comprising correlating each performance measurement in the series of performance measurements with a corresponding coverage area corresponding to a WWAN node from a set of WWAN nodes.

23. The computer program product of claim 21, further comprising monitoring the at least one performance result to provide a message when the value of the performance result has been below a threshold for a predetermined amount of time.

24. The computer program product of claim 21, further comprising calculating the performance result for a given network element at a set of time intervals, wherein each time interval in the set of time intervals corresponds to a duration of a predetermined period corresponding to an anticipated distinct traffic load.

25. The computer program product of claim 21, wherein:
the system server is a network manager located at one of a Serving-GateWay (S-GW), a Mobility Management Entity (MME), a Packet Data Network GateWay (P-GW), and an external location connected to the P-GW;
the WWAN node is an evolved Node B; and,
the WLAN AP is an AP as defined in one of Institute of Electrical and Electronics Engineers (IEEE) 802.11 specifications and IEEE 802.15 specifications.

26. The device of claim 1, wherein the measurement module and the communication module reside in an Element Manager (EM) at the interworking element.

* * * * *